May 7, 1968 W. H. HORTON 3,382,381
TAB PLATEBACK
Filed May 27, 1965 2 Sheets-Sheet 1
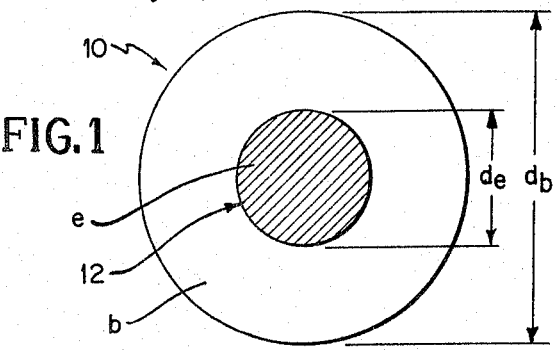
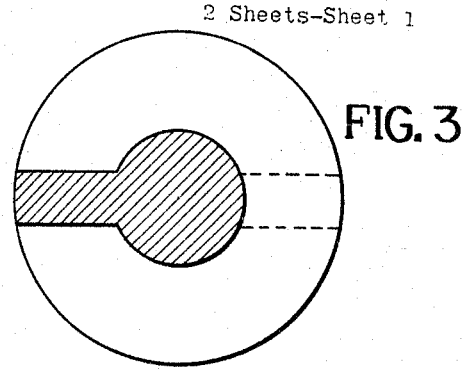
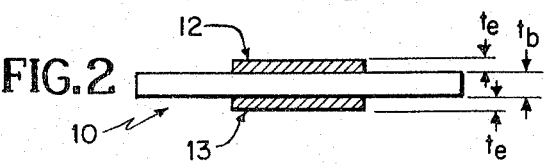
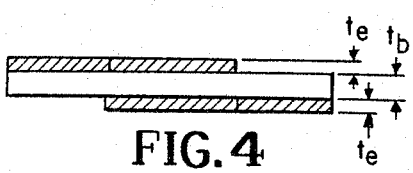
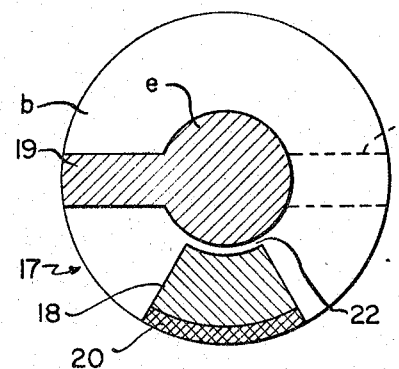
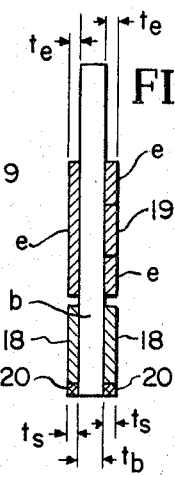
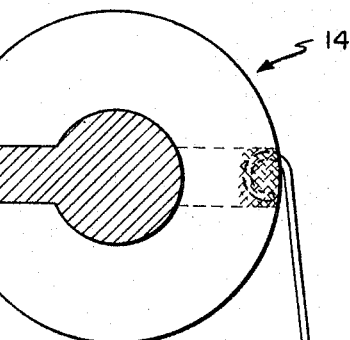
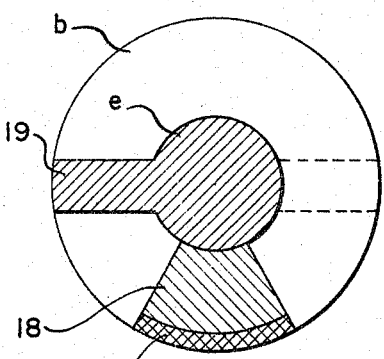
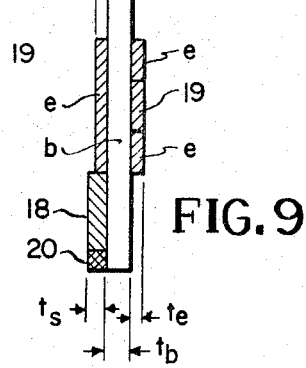
INVENTOR.
William H. Horton
BY
Dominik and Stein
ATTY'S May 7, 1968  W. H. HORTON  3,382,381
TAB PLATEBACK
Filed May 27, 1965  2 Sheets-Sheet 2
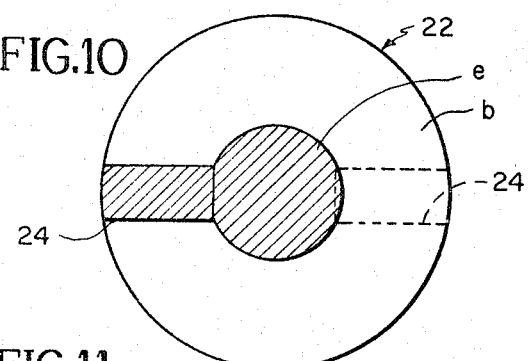
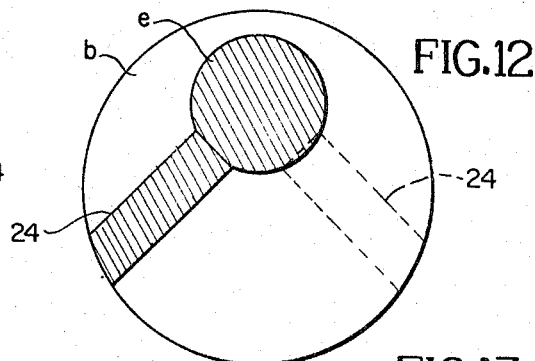
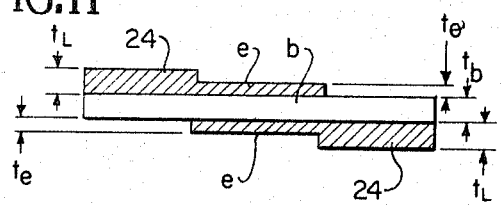
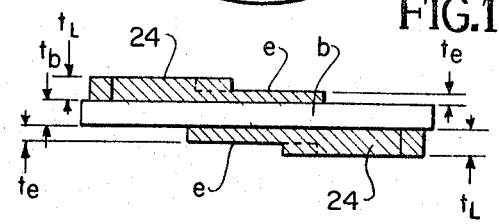
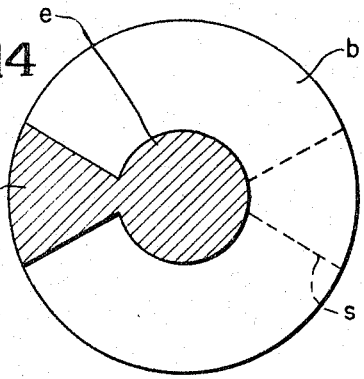
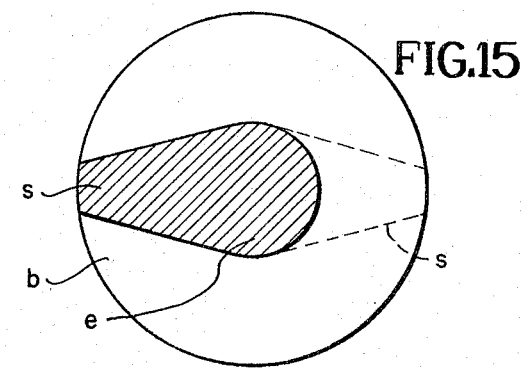
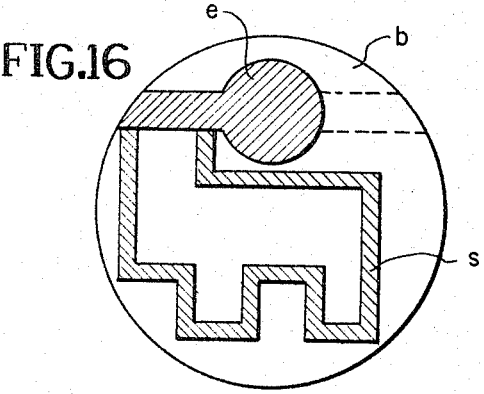
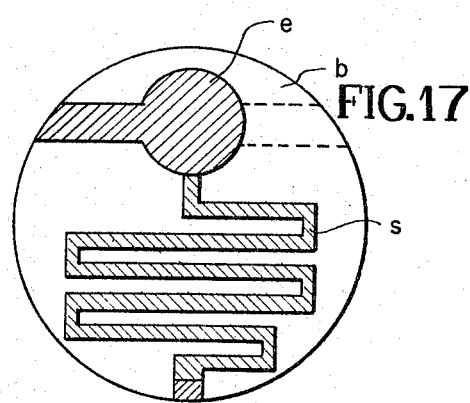
INVENTOR.
William H. Horton
BY
Dominik and Stein
ATTY'S United States Patent Office 3,382,381
Patented May 7, 1968

3,382,381
TAB PLATEBACK
William H. Horton, Orlando, Fla., assignor to Piezo Technology Inc., Orlando, Fla., a corporation of Florida
Filed May 27, 1965, Ser. No. 459,411
7 Claims. (Cl. 310—8.2)

This invention relates generally to piezoelectric elements and in particular it relates to quartz crystals for relatively high frequency use.

Piezoelectric crystals are particularly applicable for use in filters, and particularly filters for use at high frequencies. One of the more serious problems encountered with the presently available crystals, for high frequency application, is the large number of anharmonic overtones, within a frequency range of a few tenths of one percent of the fundamental frequency, which are strongly driven and which generally make the crystal useless for filter application.

In recent years, considerable investigation has been made and a number of techniques for eliminating unwanted or spurious responses of crystals in the vicinity of their fundamental frequencies have been developed. These techniques generally have not been suitable for thickness shear AT type crystals and, more recently, wave theory in AT type quartz crystals has therefore been the subject of intensive investigation. All of the techniques presently available for eliminating the unwanted responses of AT type crystals are, however, unsatisfactory, for one reason or another.

Accordingly, it is an object of the present invention to provide thickness shear crystal resonators which are particularly applicable for high frequency use.

It is a further object of the invention to provide a new and improved technique for fabricating thickness shear crystal resonators, for high frequency applications and particularly for high frequency applications with filters.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawings, in which:

FIGURES 1 and 2 are a top and a sectional view, respectively, of an idealized resonator;

FIGURES 3, 4 and 5 are a top and a sectional view of a resonator with tabs plated thereon for coupling to the electrode, and the resonator with leads secured thereto, respectively;

FIGURES 6 and 7 are a top and a sectional view, respectively, of a resonator fabricated in accordance with a first embodiment of the invention;

FIGURES 8 and 9 are a top and a sectional view, respectively, illustrating a second manner in which the resonator of FIGS. 6 and 7 can be fabricated;

FIGURES 10 and 11 are a top and a sectional view, respectively, of a resonator fabricated in accordance with a second embodiment of the invention;

FIGURES 12 and 13 are a top and a sectional view, respectively, of a resonator with an electrode orientation to provide increased tab length;

FIGURES 14 and 15 are top views of a resonator illustrating different tab configurations, in accordance with the present invention; and FIGURES 16 and 17 are top views of a resonator illustrating how long selective suppression paths can be provided, in accordance with the present invention.

Similar reference characters refer to similar parts throughout the several views of the drawings.

As is generally well known in the art, wave propagation characteristics of crystal resonators depend upon the mode of vibration and dimensional properties of the crystal. For the thickness shear and thickness twist modes, propagation is dependent upon the resonator effective thickness—which determines the wave cut-off frequency, below which energy propagates with exponential attenuation—and boundary conditions existant on the resonator edges and where external connections are made.

In FIGS. 1 and 2 there is shown an idealized resonator 10 having metal plated electrodes 12 and 13, with two principal regions indicated thereon. These principal regions correspond to the quartz blank region $b$, where the quartz thickness is $t_b$ and the electrode region $e$, where the quartz and plating thickness is $t_b$ and $2t_e$ respectively.

The frequency of vibration energy in the $e$ region must be above the $b$ region cut-off frequency $\omega_b$ in order to propagate into the $b$ region. Below this frequency, energy is attenuated exponentially in the $b$ region, in which case, if the resultant attenuation rate $\alpha$ and the path length are adequate, $e$ region energy is isolated from the boundary portion of region $b$.

The attenuation rate is approximately proportional to the square root of the normalized difference between the $b$ region cut-off frequency and the energy frequency. That is $$\alpha \doteq k_b \sqrt{\frac{\omega_b - \omega}{\omega_b}}$$

where $k_b$ is an appropriate constant.

The path length, for the resonator of FIGS. 1 and 2, is just one-half the diameter difference between the two regions.

The frequency $\omega_b$ is inversely proportional to blank thickness $t_b$ according to:

$$\omega_b = \frac{N}{t_b} n$$

where $N$ is a frequency constant, being approximately 1670 kHz./mm. for AT-cut blanks, and $n$ (the overtone) is an odd positive integer.

In the $e$ region, the lowest resonant frequency is the main mode and higher anharmonic modes are at frequencies $\omega_{ro} < \omega_{r1} \ldots < \omega_{rk} \ldots < \omega_{rn}$. Resonance cannot be sustained at frequencies below $\omega_{ro}$ in the thickness shear and thickness twist modes of vibration. The frequency $\omega_{ro}$ is dependent upon the thicknesses $t_b$ and $t_e$ and the densities $\rho_Q$ of the quartz and $\rho_e$ of the electrode material according to the relation $$\omega_{ro} \doteq \frac{N}{t_b}\left(1 - 2\frac{t_e}{t_b}\frac{\rho_e}{\rho_Q}\right)n$$

where $N$ is a frequency constant and $n$, the overtone, as defined above.

The spacing between $\omega_{ro}$ and higher anharmonic modes is approximately inversely related to the electrode diameter to blank thickness ratio $d_e/t_b$. By choosing $d_e$, $t_e$ and $t_b$ such that $$\omega_{ro} < \omega_b \leq \omega_{r1}$$

and by providing damping at the blank edge boundary, the main mode energy can be isolated within the $e$ region while the high anharmonic modes are propagated to the edge and dissipated. In this manner the unwanted anharmonic modes above $\omega_{ro}$ are suppressed.

In FIGS. 3, 4 and 5, a more realistic resonator structure 14 including a lead attachment generally represented by the reference numeral 16 is shown. In the practical fabrication of crystal units of this type, the thickness $t_e$ is adjusted in order to adjust the main mode frequency $\omega_{ro}$ to a desired value. If, at the same time, it is necessary to achieve unwanted mode suppression, the value of $t_e$ must be prescribed within narrow limits. Thus, it is necessary to also carefully prescribe the value of $t_b$ in order to allow final frequency calibration without exceeding the design tolerance on $t_e$. At high frequencies it also happens that the value of $t_e$ is unreasonably small, so that control of the film properties becomes a problem. To avoid these two effects and still achieve unwanted mode suppression, it would be desirable to provide some mechanism other than the electrode to blank thickness ratio for selective suppression.

One such method, according to the present invention, is to provide a third region $s$ in which the cut-off frequency has been decreased to $\omega_s$. In FIGS. 6 and 7, a resonator 17 is shown having an electrode region $e$, a blank region $b$ and lead attachment tabs 19 on opposite sides thereof. The third region comprises a truncated pi-section 18 plated to thickness $t_s$ on each of its sides. The object then is to adjust the thickness $t_s$ so that $$\omega_{ro} < \omega_s \leq \omega_{r1}$$

thus providing a selective propagation path for the unwanted modes. The edge region of the truncated pi-section 18 is provided with damping material 20, which may be of an appropriate type. $\omega_s$ can be adjusted independently of $\omega_{ro}$, so that the previous interaction effects are avoided.

While this method provides a workable technique for suppressing the unwanted responses, if the plated truncated pi-section 18 is of a conductive material, a gap 22 must be provided between region $e$ and $s$. The gap 22 must be made small compared with the effective blank thickness ($t_b/n$), and at high frequencies the gap may be so small, or narrow, as to be impractical to achieve. To avoid this difficulty, non-conductive plating can be used, thereby allowing the pi-sector 18 to slightly overlap the main electrodes $e$ without significantly altering the main resonator characteristics.

It may be noted that the dual surface selective mode propagation path of the resonator of FIGS. 6 and 7 can be modified to give virtually the same effect by plating on only one side of the blank to provide the "$s$" region, as shown in FIGS. 7 and 8. In the case of the resonator of FIG. 4, it is possible to use a conductive film material without significantly distorting the electrode region fields.

In FIGS. 10 and 11 there is shown a resonator 22 constructed with still another technique which, according to the invention, is a much more simple approach. With this technique, the selective path region $s$ is combined with the lead attachment tabs indicated by the reference numeral 24. Here the tabs 24 are made to be of thickness $t_L$ such that $$\omega_{ro} < \omega_L \leq \omega_{r1}$$

where the frequency determined (in the same manner as $t_e$ determines $\omega_{ro}$ in Equation 3) by $t_L$ is $\omega_L$. To achieve this, the thickness of tabs 24 must be slightly less than twice the thickness of the electrode region $e$, since only one surface of the tab region is plated. The advantage of this technique is that now the thickness of the electrode region $e$ is not critical from the standpoint of mode suppression, the critical element now being the difference in thickness of the tabs 24 and the electrode region. This technique therefore allows calibration (of $\omega_{ro}$) to be achieved independently of suppression requirements and thereby relieves the previous tolerance requirements on $t_e$ and $t_b$. The method is also relatively easy to accomplish in practice by replating the tab region after the original tab and electrode have been deposited. It also eliminates the need for special damping at the edge, this function being served adequately for most purposes by the lead attachment. Finally, by allowing the difference $\omega_b - \omega_{ro}$ to be as large as desired, all edge effects (except those associated with the desired tab suppression path) can be eliminated.

The ability of the suppression path to discriminate by damping the undesired anharmonic overtone modes without damping the desired main mode depends as previously noted upon the mode spacing and the path length. Mode spacing establishes the maximum value possible for the desired main mode attenuation coefficient when the undesired anharmonic mode attenuation coefficient is made to vanish ($\omega_{r1} = \omega_s$). By maximizing the path length, the path attenuation to the main mode can be maximized, thereby minimizing the main mode damping due to the suppression path. Where necessary due to insufficient mode spacing, selective performance can therefore be improved by using an electrode-blank configuration as shown in FIGS. 12 and 13. In this case, $t_e$ is made sufficiently large to assure isolation of the main mode in the electrode area from the nearby blank edges.

As in the case of the resonator of FIGS. 6 and 7, the tab plating of the resonators of FIGS. 10–13 need not be added to each tab. It is possible to achieve satisfactory selective damping with a single increased thickness tab, analogous to the single surface selective path shown in FIGS. 8 and 9.

In FIGS. 16 and 17 there are shown special orientations which can be provided, in the event an extremely long selective path length is required. Adjacent path areas are isolated from each other so long as the path cut-off frequency is well below the intervening blank cut-off frequency, and the separation distance between paths is several wavelengths. This allows extremely long effective lengths to be achieved on a small diameter blank. Also, if the paths shown in FIGS. 16 and 17 are single sided plated surfaces, conductive material can be used.

Note that in all figures showing lead connection tabs, the tabs may be made of various shapes, such as shown in FIGS. 14 and 15. Also note that the techniques described apply equally well to either fundamental mode or overtone operated crystal units.

In the above explanation of the invention, the relationship of the various frequencies may be more clearly understood from the following:

$\omega_{ro}$ is the (radian) frequency of the main (desired) mode of vibration. $\omega_{r1}$ is the frequency of the first or nearest (to the main mode) anharmonic overtone (undesired) mode. All other anharmonic overtone modes are higher in frequency than $\omega_{r1}$. For these anharmonic overtone type modes the tab or tabs 24 may be considered to form a high pass transmission path with cutoff frequency of $\omega_L$. If $\omega_{ro} < \omega_L < \omega_{r1}$ then the main mode is unable to propagate along the tabs 24, but the first and all higher unwanted (anharmonic) modes can. The latter may thus be transmitted to a region such as the end of the tab, where they are dissipated by some form of mechanical damping.

The equation for $\omega_L$ is only approximate, being dependent upon the quartz cut, tab width and orientation and other factors. In practice, the thickness $t_L$ on which $\omega_L$ is most directly dependent, is most readily determined experimentally.

If the condition $\omega_{rm} < \omega_L < \omega_{rn}$ exists, where $$\omega_{r1} < \omega_{r2} < \ldots \omega_{rm} < \omega_{rm+1} \ldots < \omega_{rn} \ldots$$

then all modes below the $n$th remain physically contained within the main electrode region and damping at the tab extremities affects only the $n$th and higher modes.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A resonator for relatively high frequency use comprising a crystal having formed thereon an electrode region and lead attachment tabs, said lead attachment tabs having a thickness $t_L$ such that $$\omega_{ro} < \omega_L \leq \omega_{r1}$$

where the frequency determined by $t_L$ is $\omega_L$, in accordance with the equation $$\omega_L \doteq \frac{N}{t_b}\left(1 - 2\frac{t_L}{t_b}\frac{\rho_e}{\rho_Q}\right)n$$

$n$ (the overtone number) is an odd positive integer; and where $N$ is a frequency constant being approximately 1670 kHz./mm.; $t_b$ is the thickness of said crystal; $\rho_e$ is the density of the material of said electrode region; and $\rho_Q$ is the density of said crystal, for suppressing unwanted anharmonic overtone responses in the vicinity of the main mode frequency of said resonator.

2. A resonator for relatively high frequency use comprising a crystal having formed on each side thereof a metallic electrode region, a truncated pi-section region formed thereon, on each side of said crystal for suppressing unwanted anharmonic overtone responses in the vicinity of the main mode frequency of said resonator, and damping material formed on the edge of said pi-section regions, said pi-section region on each side of said crystal having a thickness such that $\omega_{ro} < \omega_s \leq \omega_{r1}$; where $\omega_s$ is the cut-off frequency.

3. A resonator, according to claim 2, wherein said pi-sections are of a non-conductive material.

4. A resonator, according to claim 2, wherein said pi-sections are of a conductive material and wherein there is provided a gap between said electrode region and said pi-sections.

5. A resonator for relatively high frequency use comprising a quartz crystal having formed on each side thereof a metallic electrode region, a truncated pi-section region formed thereon for suppressing unwanted anharmonic overtone responses in the vicinity of the main mode frequency of said resonator, and damping material formed on the edge of said pi-section regions, said pi-section region on each side of said crystal having a thickness $t_s$ such that $\omega_{ro} < \omega_s \leq \omega_{r1}$; where the frequency determined by $t_s$ is $\omega_s$, in accordance with the formula $$\omega_s \doteq \frac{N}{t_b}\left(1 + 2\frac{t_s}{t_b}\frac{\rho_e}{\rho_Q}\right)n$$

$n$ (the overtone number) is an odd positive integer; and where $N$ is a frequency constant being approximately 1670 kHz./mm.; $t_b$ is the thickness of said crystal; $\rho_e$ is the density of the material of said electrode region; and $\rho_Q$ is the density of said crystal.

6. A resonator for relatively high frequency use comprising a crystal having formed thereon an electrode region, a selective path region $s$ and lead attachment tabs, said selective path region $s$ being combined with said lead attachment tabs to suppress unwanted anharmonic overtone responses, said tabs being formed having a thickness $t_L$ such that $$\omega_{ro} < \omega_L \leq \omega_{r1}$$

where the frequency determined by $t_L$ is $\omega_L$, in accordance with the equation $$\omega_L \doteq \frac{N}{t_b}\left(1 - 2\frac{t_L}{t_b}\frac{\rho_e}{\rho_Q}\right)n$$

$n$ (the overtone number) is an odd positive integer; and where $N$ is a frequency constant being approximately 1670 kHz./mm.; $t_b$ is the thickness of said crystal; $\rho_e$ is the density of the material of said electrode region; and $\rho_Q$ is the density of said crystal.

7. A resonator for relatively high frequency use comprising a crystal having formed thereon an electrode region, a selective path region $s$ and lead attachment tabs, said selective path region $s$ being combined with one of said lead attachment tabs to suppress unwanted anharmonic overtone responses, said lead attachment tabs and said selective path region $s$ having a thickness $t_L$ such that $$\omega_{ro} < \omega_L \leq \omega_{r1}$$

where the frequency determined by $t_L$ is $\omega_L$, in accordance with the equation $$\omega_L \doteq \frac{N}{t_b}\left(1 - 2\frac{t_L}{t_b}\frac{\rho_e}{\rho_Q}\right)n$$

$n$ (the overtone number) is an odd positive integer; and where $N$ is a frequency constant being approximately 1670 kHz./mm.; $t_b$ is the thickness of said crystal; $\rho_e$ is the density of the material of said electrode region; and $\rho_Q$ is the density of said crystal.

References Cited

UNITED STATES PATENTS

| | | | |
|---|---|---|---|
| 2,249,933 | 7/1941 | Bechmann | 310—9.5 |
| 2,481,806 | 9/1949 | Wolfskill | 310—9.7 |
| 2,482,661 | 9/1949 | Dimmick | 310—9.2 |
| 2,635,199 | 4/1953 | Wolfskill | 310—9.7 |
| 2,656,473 | 10/1953 | Warner | 310—9.4 |
| 2,799,789 | 7/1957 | Wolfskill | 310—9.0 |
| 2,850,651 | 9/1958 | Hoffman | 310—9.4 |
| 2,859,346 | 11/1958 | Firestone | 310—9.5 |
| 2,967,958 | 1/1961 | Kosowsky | 310—9.4 |
| 3,222,622 | 12/1965 | Curran | 333—72 |

MILTON O. HIRSHFIELD, *Primary Examiner.*

J. D. MILLER, *Examiner.*